(12) United States Patent
Boydstun, IV et al.

(10) Patent No.: US 7,329,075 B2
(45) Date of Patent: Feb. 12, 2008

(54) VEHICLE SUPPORT AND RETENTION SYSTEM FOR A VEHICLE TRANSPORTER

(75) Inventors: Robert D. Boydstun, IV, Clackamas, OR (US); John Thomas Huey, Milwaukie, OR (US); Paul Joseph Heger, Portland, OR (US); James K. Carey, Vancouver, WA (US)

(73) Assignee: Boydstun Metal Works Inc., Portland, OR (US)

( * ) Notice: Subject to any disclaimer, the term of this patent is extended or adjusted under 35 U.S.C. 154(b) by 0 days.

(21) Appl. No.: 11/502,651

(22) Filed: Aug. 11, 2006

(65) Prior Publication Data

US 2006/0275095 A1    Dec. 7, 2006

Related U.S. Application Data

(62) Division of application No. 11/137,756, filed on May 25, 2005, now Pat. No. 7,114,897.

(51) Int. Cl.
*B61D 45/00* (2006.01)
(52) U.S. Cl. .................................................. 410/100
(58) Field of Classification Search .............. 410/100, 410/96, 103; 16/110.1, 422, 427; 74/544, 74/545; 81/177.1, 177.85, 489; 7/168
See application file for complete search history.

(56) References Cited

U.S. PATENT DOCUMENTS 1,892,589 A    12/1932    Snyder

| 2,159,848 A | 5/1939 | Gibbons |
| 2,492,829 A | 12/1949 | Baker |
| 2,713,499 A | 7/1955 | Wagner |
| 2,934,319 A | 4/1960 | Wahlstrom |
| 3,084,970 A | 4/1963 | Day |
| 3,209,706 A | 10/1965 | Broling |
| 3,473,487 A | 10/1969 | Blunden |
| 3,690,717 A | 9/1972 | Taylor |
| 3,860,263 A | 1/1975 | Taylor |
| 3,880,457 A | 4/1975 | James, Jr. |
| 4,081,196 A | 3/1978 | Dandridge, Jr. |
| 4,221,422 A | 9/1980 | Harold |
| 4,267,901 A | 5/1981 | Tsujimura |

(Continued)

FOREIGN PATENT DOCUMENTS

DE    1 134 334    10/1958

(Continued)

OTHER PUBLICATIONS http://cottrelltrailers.com/news/news.php?nMode=detail&nid= 4, May 5, 2006, Cottrel Inc., Gainesville GA.

(Continued)

*Primary Examiner*—H Gutman
(74) *Attorney, Agent, or Firm*—Chernoff, Vilhauer, McClung & Stenzel, LLP

(57) ABSTRACT

A cargo retaining winch includes a rotationally secured winch shaft that is substantially longer than the width of a flexible member to be wound on the winch to secure cargo. The flexible member can be wound in one of a continuity of locations along the longitudinal axis of the winch shaft to improve alignment of the flexible member and the cargo.

16 Claims, 13 Drawing Sheets

U.S. PATENT DOCUMENTS

| | | |
|---|---|---|
| 4,273,484 A | 6/1981 | Blanar |
| 4,296,691 A | 10/1981 | Lohr |
| 4,367,993 A * | 1/1983 | Meigs .................. 410/103 |
| 4,369,008 A | 1/1983 | Cooper |
| 4,369,009 A | 1/1983 | Fulford |
| 4,382,736 A | 5/1983 | Thomas |
| 4,455,119 A | 6/1984 | Smith |
| 4,582,500 A | 4/1986 | Hanson et al. |
| 4,609,179 A | 9/1986 | Chern et al. |
| 4,624,188 A | 11/1986 | Kaleta |
| 4,701,086 A | 10/1987 | Thorndyke |
| 4,759,668 A | 7/1988 | Larsen et al. |
| 4,786,222 A | 11/1988 | Blodgett |
| 4,792,268 A | 12/1988 | Smith |
| 4,822,222 A | 4/1989 | Zeuner et al. |
| 4,911,590 A | 3/1990 | Green |
| 4,919,582 A | 4/1990 | Bates et al. |
| 4,921,218 A | 5/1990 | Andre |
| 4,960,353 A | 10/1990 | Thorndyke |
| 4,964,767 A | 10/1990 | Leitz |
| 4,992,013 A | 2/1991 | Westerdale |
| 4,993,898 A | 2/1991 | Klahold |
| 5,011,347 A | 4/1991 | Bullock |
| 5,051,046 A | 9/1991 | Oren |
| 5,067,862 A | 11/1991 | Andre |
| 5,071,298 A | 12/1991 | Conzett |
| 5,078,560 A | 1/1992 | Patrick et al. |
| 5,080,541 A | 1/1992 | Andre |
| 5,180,262 A | 1/1993 | Westerdale |
| 5,213,458 A | 5/1993 | Preller et al. |
| 5,277,407 A | 1/1994 | Mayne et al. |
| 5,297,908 A | 3/1994 | Knott |
| 5,314,275 A | 5/1994 | Cottrell et al. |
| 5,322,003 A | 6/1994 | Winyard et al. |
| 5,330,148 A | 7/1994 | Floyd |
| 5,429,474 A | 7/1995 | Knott |
| 5,441,371 A | 8/1995 | Erke |
| 5,595,465 A | 1/1997 | Knott |
| 5,702,222 A | 12/1997 | Rosen |
| 5,746,554 A | 5/1998 | Boydstun, IV et al. |
| 5,755,540 A | 5/1998 | Bushnell |
| 5,836,730 A | 11/1998 | Boydstun, IV et al. |
| 5,853,164 A * | 12/1998 | Hunt .................... 254/213 |
| 5,853,280 A | 12/1998 | Lohr |
| 5,860,777 A * | 1/1999 | Walsh et al. ............. 410/100 |
| 5,902,082 A | 5/1999 | Kaemper |
| 5,937,972 A | 8/1999 | Andre |
| 5,938,382 A | 8/1999 | Andre et al. |
| 6,142,447 A | 11/2000 | Jean-Luc et al. |
| 6,171,036 B1 | 1/2001 | Boydstun, IV et al. |
| 6,171,037 B1 | 1/2001 | Andre |
| 6,231,294 B1 | 5/2001 | Young et al. |
| 6,250,861 B1 * | 6/2001 | Whitehead ............. 410/100 |
| 6,328,511 B1 | 12/2001 | Cardona |
| 6,425,465 B1 | 7/2002 | Tallman et al. |
| 6,439,814 B1 | 8/2002 | Floe |
| 6,447,226 B1 | 9/2002 | Andre |
| 6,572,312 B2 | 6/2003 | Cottrell |
| 6,575,678 B2 | 6/2003 | Cottrell |
| 6,616,388 B1 | 9/2003 | Floe |
| 6,626,621 B1 | 9/2003 | Hugg |
| 6,848,871 B1 | 2/2005 | Cottrell |
| 7,056,073 B2 | 6/2006 | Ardo |
| 7,114,897 B1 | 10/2006 | Boydstun, IV et al. |
| 7,160,069 B2 * | 1/2007 | Adams .................. 410/104 |
| 2002/0051692 A1 | 5/2002 | Cottrell |
| 2002/0192063 A1 | 12/2002 | Fluke, Jr. |
| 2003/0017019 A1 | 1/2003 | Cottrell |
| 2003/0132014 A1 | 7/2003 | Marshall |
| 2004/0037664 A1 | 2/2004 | Woodruff |
| 2006/0263160 A1 | 11/2006 | Howes |
| 2006/0263161 A1 | 11/2006 | Howes |

FOREIGN PATENT DOCUMENTS

| | | |
|---|---|---|
| DE | 3920323 C2 | 6/1989 |
| DE | 68910434 T2 | 5/1994 |
| DE | 69210103 T2 | 11/1996 |
| DE | 69702711 T2 | 5/2001 |
| EP | 0 001 364 | 4/1979 |
| EP | 0311543 | 4/1989 |
| EP | 0 518 795 B1 | 4/1996 |
| EP | 1326791 | 7/2006 |
| FR | 72.14936 | 11/1973 |
| FR | 2621282 | 4/1989 |
| GB | 927361 | 5/1963 |
| WO | WO 90/05043 | 5/1990 |
| WO | WO2006124254 | 11/2006 |
| WO | WO2006124262 | 11/2006 |

OTHER PUBLICATIONS

"Model C-09SS Highside Screw Unit," http://cottrelltrailers.com/product/print.php?id=17, May 5, 2006, pp. 1-2, Cottrel Inc., Gainesville, GA.
"Model C-11SS High Side Screw Unit," http://cottrelltrailers.com/product/print.php?id=18, May 5, 2006, pp. 1-2, Cottrel Inc., Gainesville, GA.
Operator's Manual for Car-Hauling Equipment, Feb. 2006, Cottrel Inc., Gainesville, GA.
CHR 1.00 Product Data Sheet, Apr. 2003, Lohr Industrie, France.
Eurolohr 1.00 E Product Data Sheet, Jun. 2004, Lohr Industrie, France.
Multilohr 2.00 Fiche Produit, Apr. 2003, Lohr Industrie, France.
Eurolohr 3.00 Fiche Produit, Apr. 2003, Lohr Industrie, France.
Complaint For Patent Infringement, Oct. 13, 2006.
Summons in Civil Action, Oct. 3, 2006.
Plaintiff Boydstun Metal Works, Inc.'s Corporate Disclosure Statement, Oct. 16, 2006.
Amended Complaint (First) For Patent Infringement, Oct. 17, 2006.
Affidavit Of Melanie S. Stone In Support Of Cottrell, Inc.'s Motion To Transfer, Nov. 6, 2006.
Cottrell Inc.'s Memorandum In Support Of Its Motion To Transfer, Nov. 6, 2006.
Cottrell, Inc.'s Memorandum In Support Of Its Motion To Transfer, Nov. 6, 2006.
Cottrell, Inc.'s Motion To Transfer, Nov. 6, 2006.
Notice Of Later-Filed Related Case Pending In Georgia, Nov. 6, 2006.
Cottrell, Inc.'s Answer, Affirmative Defenses, And Counterclaim To Plaintiff's First Amended Complaint, Nov. 14, 2006.
Declaration Of Robert D. Boydstun Iv In Response To Defendant's Motion To Transfer, Nov. 20, 2006.
Plaintiff's Memorandum In Response To Defendant's Motion To Transfer, Nov. 20, 2006.
Cottrell, Inc's Reply In Support Of Its Motion To Transfer, Dec. 1, 2006.
Boydstun Metal Works, Inc.'s Reply To Defendant's Counterclaims, Dec. 7, 2006.
Boydstun Metal Works, Inc.'s Brief In Support Of Motion To Consolidate, Dec. 19, 2006.
Boydstun Metal Works, Inc.'s Motion To Consolidate, Dec. 19, 2006.
Certified Copy Of Priority Document, U.S. Appl. No. 11/334,237, filed Jan. 18, 2006.
Certified Copy Of Priority Document, U.S. Appl. No. 60/681,758, filed May 17, 2005.
Prosecution file, U.S. Appl. No. 11/334,011, filed Jan. 18, 2006.
File wrapper, U.S. Appl. No. 11/334,011, filed Jan. 18, 2006.
File wrapper, U.S. Appl. No. 11/334,237, filed Jan. 18, 2006.
Cottrell, Inc.'s Opposition To Boydstun Metal Works, Inc's Motion To Consolidate, Jan. 3, 2007.
Boydstun Metal Works, Inc.'s, Inc.'s Reply In Support Of Motion To Consolidate, Jan. 18, 2007.

Cottrell, Inc.'s Objections And Responses To Plaintiff's First Set Of Interrogatories, Apr. 18, 2007.

Plaintiff Boydstun Metal Works, Inc.'s Responses To Cottrell, Inc.'s First Set Of Interrogatories, Apr. 18, 2007.

Cottrell, Inc.'S Supplemental Objections And Responses To Interrogatories 5, 6 And 7 Of Plaintiff's First Set Of Interrogatories, May 18, 2007.

* cited by examiner

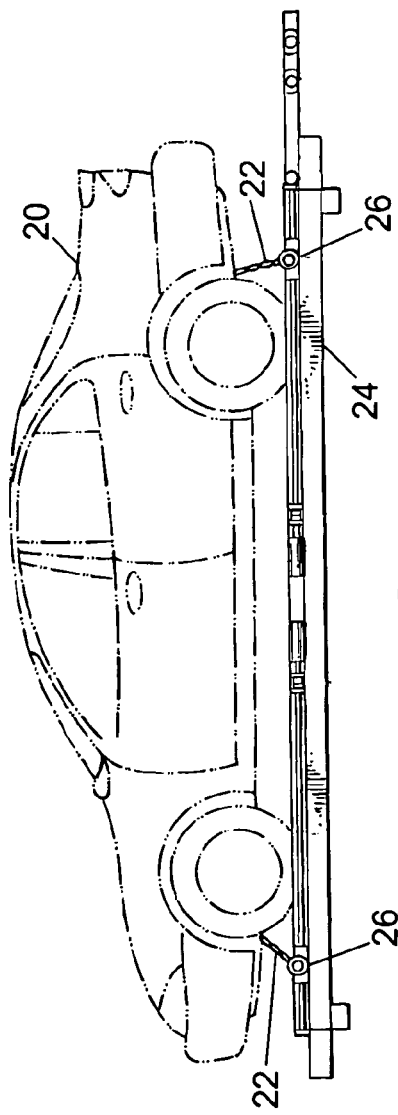
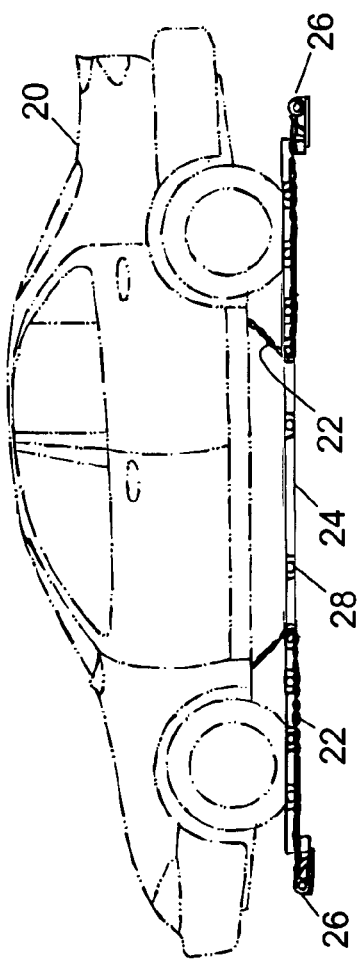
FIG. 1A (PRIOR ART)
FIG. 1B (PRIOR ART)

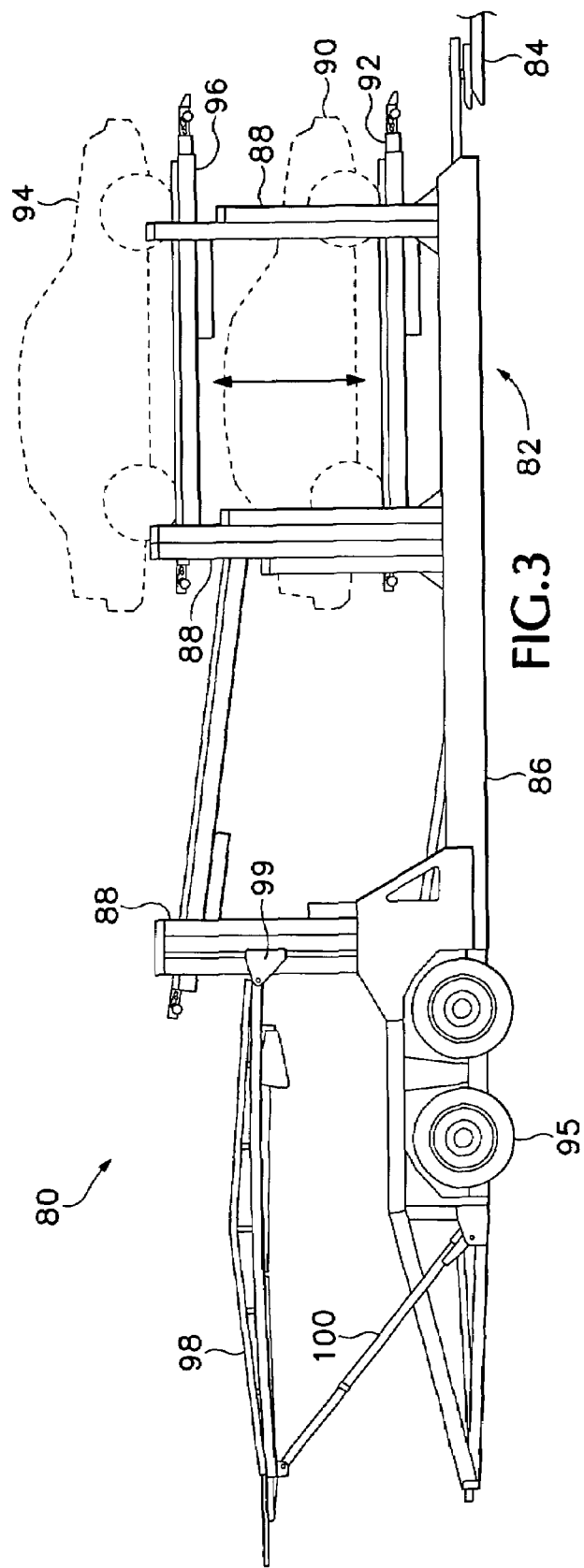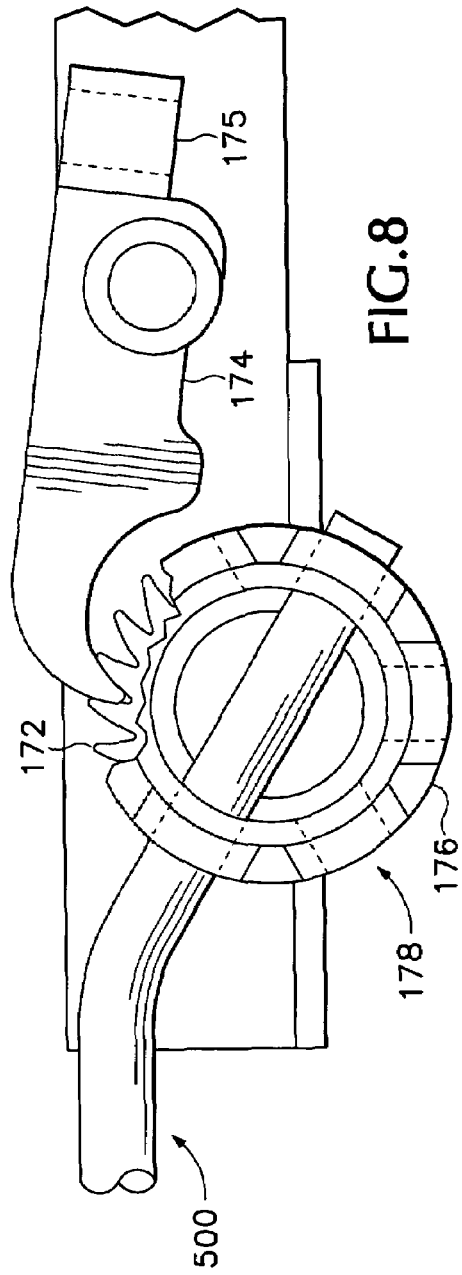

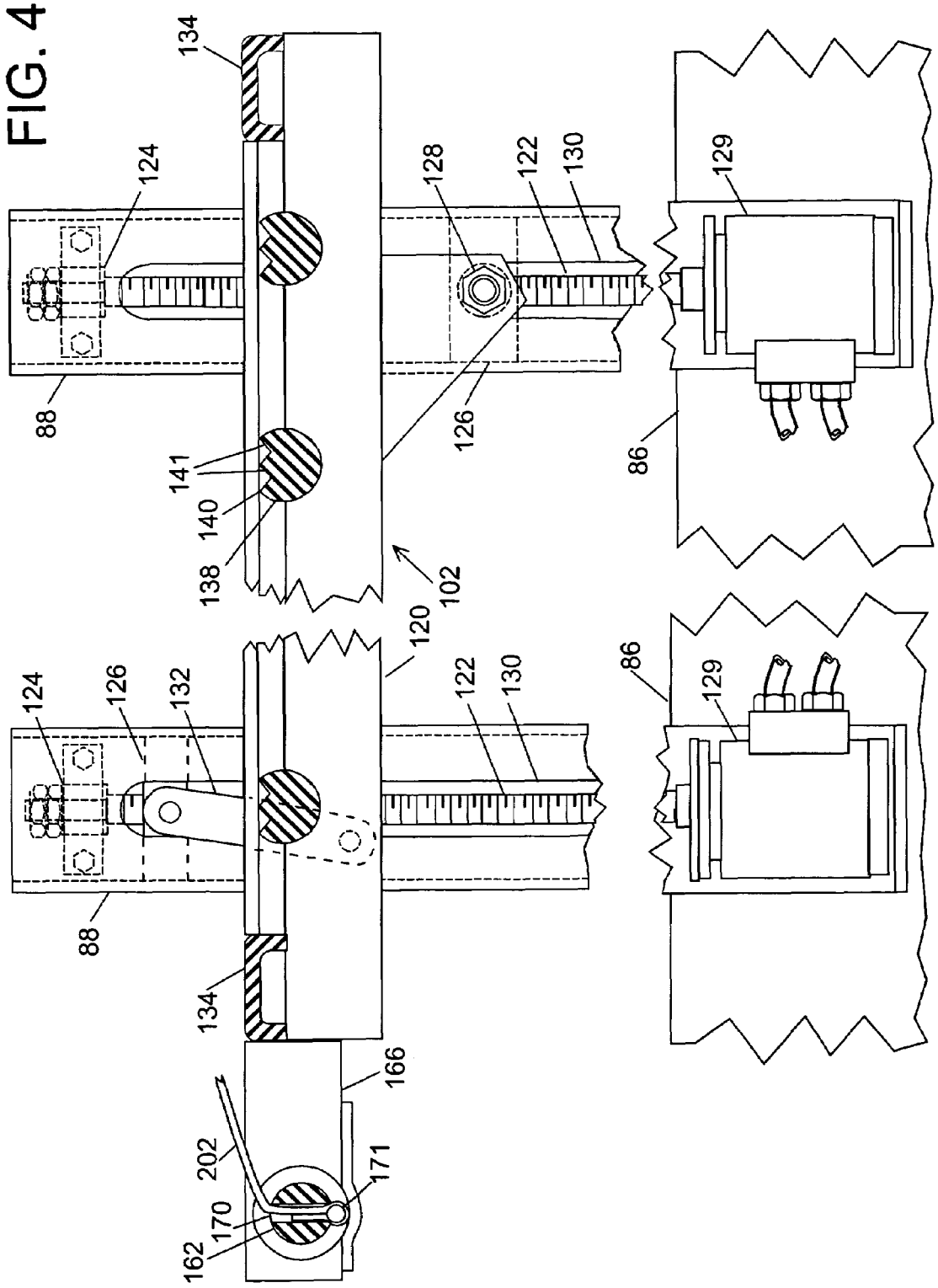

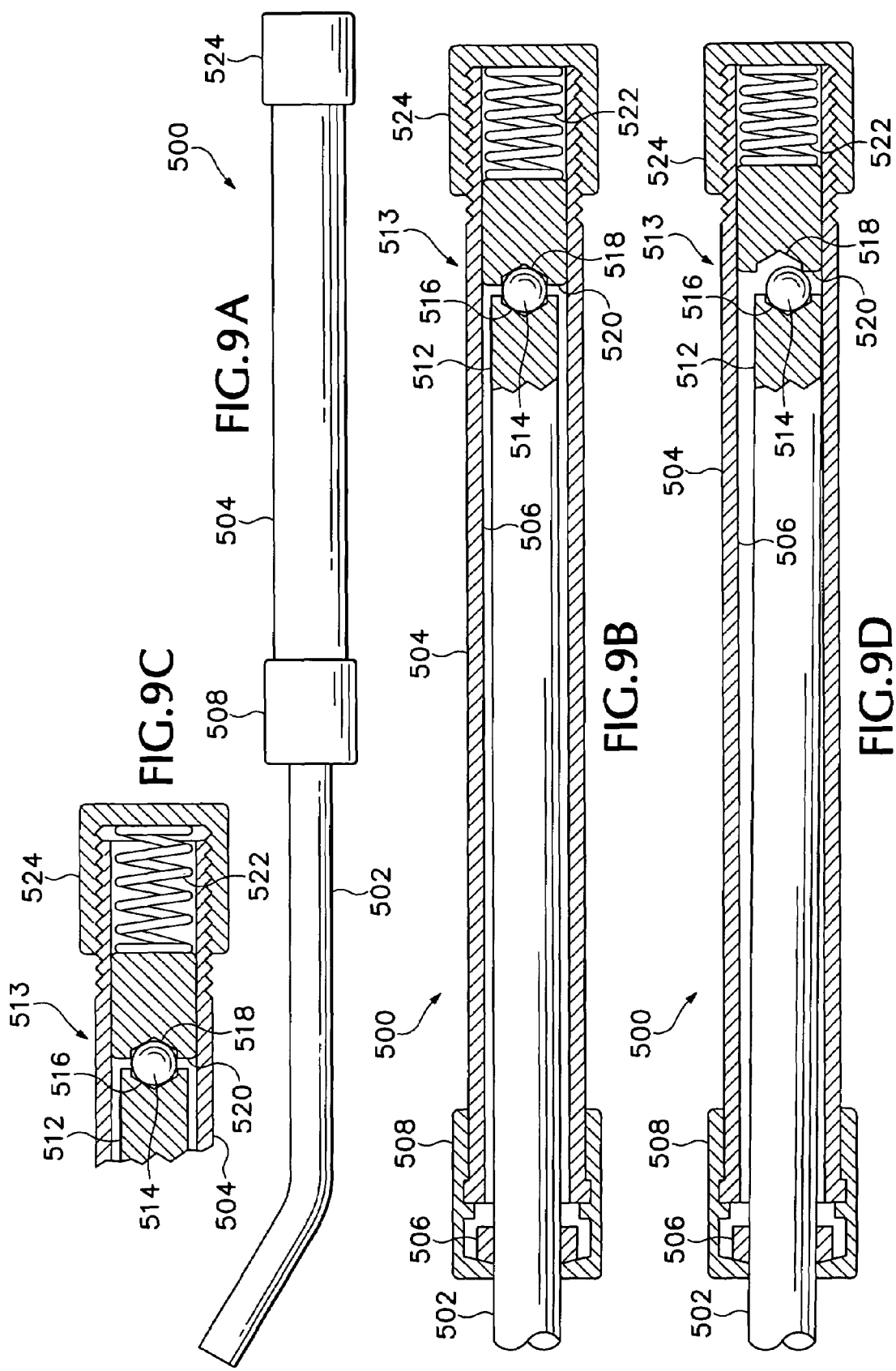

VEHICLE SUPPORT AND RETENTION SYSTEM FOR A VEHICLE TRANSPORTER

CROSS-REFERENCE TO RELATED APPLICATIONS

This is a division of application Ser. No. 11/137,756, filed May 25, 2005 now U.S. Pat. No. 7,114,897.

BACKGROUND OF THE INVENTION

The present invention relates to a winch and, more particularly, to a winch for restraining cargo on a vehicle.

Vehicles such as automobiles and light trucks are commonly transported on trucks, trailers and railway cars that are specially equipped for supporting and restraining the vehicular cargo. The cargo vehicles are typically supported on their respective running gear on vehicle supports which are, in turn, supported by the frame of the transporter. In over-the-road vehicle transporters, the wheels of the cargo vehicles typically engage elongate, perforated deck plates that are attached to a framework of a vehicle support structure and which extend parallel and adjacent to the sides of the transporter's frame. The vehicle support may be fixed in the frame of the transporter, but is often movable relative to the transporter frame to permit orienting the cargo vehicles so that the payload can be maximized and the height of the transporter reduced to satisfy legal requirements and clear overpasses and other obstacles. The vehicle supports are also commonly movable to form a surface over which the cargo vehicles can be driven during loading and unloading of the transporter. After being driven into position, the cargo vehicle is typically secured to the vehicle support to prevent movement of the vehicle due to the movement of the transporter.

Referring to FIGS. 1A and 1B, cargo vehicles 20 are commonly restrained by attaching four chains 22 to the vehicle's frame or to tie-down eyes near the corners of the vehicle's body; a procedure known as a hard tie-down. One end of the chain 22 is attached to the cargo vehicle and the other end is attached to the transporter's vehicle support 24. To prevent movement of the cargo vehicle, the chains are arranged so that tension exerted by the chains attached to the front of the vehicle acts in a direction opposite to tension exerted by the chains attached to the rear of the vehicle. Manually operated ratcheting and clamping devices are commonly used to tighten the chains and prevent the chains from loosening.

Since vehicles vary in size and construction, the arrangement of the chains is typically different for each cargo vehicle model. As a result, detailed tie-down procedures and frequent training are required to apprise transporter operators of proper tie-down methods. However, even with training hard tie-downs can be difficult to execute. Chain tensioning devices that are separate from the transporter may be attached to different points on the transporter to align the point of attachment of the chain to the vehicle and point of attachment to the transporter. However, loose chains and tensioners are easily misplaced and must frequently be carried up a ladder or up the side of the transporter's frame to reach vehicles of the transporter's upper tier of cargo. To prevent loss and reduce cargo damage or operator injury resulting from handling the heavy chains and tensioners, the chain tensioners 26 are commonly are affixed to the vehicle supports 24 and the chains 22 are commonly attached to the chain tensioners.

While a chain 22 may directly connect the chain tensioner to a tie-down eye proximate one of the outer corners of the vehicle, as illustrated in FIG. 1A, it is often necessary to attach the chain to the vehicle's frame at a point between the vehicles wheels, as illustrated in FIG. 1B. To prevent the deck plate from interfering with the routing of the chain, the chain tensioners are typically affixed to the vehicle supports so that the chain extends from the tensioner on the inside of the inner edge of the deck plate. If the connection to the vehicle is located between the front and rear wheels, the chain 22 is commonly routed around an idler 28 before being attached to the vehicle so that the tension in the chains act in opposing directions. The idler is typically one of several tubes that are spaced along the inner edge of the vehicle support 24 and project toward the center of the transporter. Since the routing of the chain from its connection on the tensioner to its connection to the cargo vehicle is variable, it is difficult for the operator to determine the correct force to apply to the chain tensioner to achieve adequate chain tension. This is particularly true when a chain, which may be corroded from exposure to the environment, must be routed over the edge of the vehicle support or around an idler that is worn or corroded. Since the tension in the chain is variable and unpredictable, the tension in the four chains used to secure a vehicle is frequently not equal and operators commonly over tighten the chains to ensure the security of the cargo vehicle or to pull the vehicle's body down to reduce the overall height of the transporter. This may damage the cargo vehicle or even cause personal injury to the operator when tightening or releasing the chains.

Many newer cars and some other vehicles utilize unitized body construction and do not have separate frames providing convenient points for attaching chains for a hard tie-down. If a convenient tie-down attachment point is not provided on the cargo vehicle's frame or body, a transporter operator may attempt to tie the vehicle down by attaching tie-down chains to the vehicle's suspension which can damage the vehicle. Referring to FIG. 2, an alternative to hard tie-down vehicle retention is a soft tie-down vehicle restraint where the individual wheels 40 of the cargo vehicle are restrained to the vehicle supports 41. After the vehicle is positioned on the vehicle support, a flexible strap 42, part of a strap assembly 60, is laid over the upper portion of the circumferential surface of the vehicle's wheel 40. The strap 42 commonly comprises a synthetic material such as nylon. A first end 44 of the strap 42 is anchored to the deck plate 47 of the vehicle support 24 on one side of the wheel. A hook or a block 46 attached to the first end 44 of the strap 42 is engaged with the deck plate by insertion in one of a plurality of apertures 48 in the deck plate. On the opposite side of the wheel, the strap 42 is routed through an idler 50 that also includes a hook or block 51 for engaging another aperture in the deck plate and the second end of the strap is anchored to the vehicle support 24 by a similar hook 52 that engages yet another aperture in the deck plate 47. The idler 50 is arranged to engage the vehicle support and restrain movement of the strap relative to the vehicle support at a point proximate to the wheel 40. A ratchet 54, incorporated in the strap assembly 60, is manually operated to wind up a portion of the strap, shortening the length of the strap between its first and second ends and tensioning the strap. Rotation and translation of the vehicle's wheel is resisted by the tensile forces exerted by the strap on the vehicle support and the friction between the strap, the vehicle support and the wheel.

While the soft tie-down restraint provides an alternative to a hard tie-down vehicle restraint, particularly for vehicles that do no have separate frames, and reduces damage resulting from inappropriate application of restraining force to vulnerable componentry, the soft tie-down method is not always the better alternative for restraining the vehicular cargo. The tires of the cargo vehicle can be damaged when the soft tie-down restraint is used. As the cargo vehicle shifts against the restraining strap, the strap rubs against the tire and can damage or become embedded in the tread. Relative movement of the strap and the wheel and embedding of the strap in the tread are aggravated, respectively, by under-tensioning or over-tensioning of the strap 42. However, it is difficult to accurately tension the strap with a strap mounted ratchet 54 because the angle at which the operator applies force to the ratchet handle 56 changes as the handle moves and as the operator assumes differing positions relative to the ratchet to secure vehicles at the various positions on the transporter. In addition, the combined ratchet and strap assembly is a loose item that can easily be lost, damaged or dropped on one of the cargo vehicles. Moreover, the perforated deck plates of the typical vehicle support provide a limited number of places for attaching the restraining strap to the vehicle support. On the other hand, the transverse position of the wheel on the vehicle support is highly variable due to differences in vehicle position and tread width. As a result, aligning the strap and the points of engagement of the strap to the transporter with the lateral center of the wheel's surface is a matter of chance. However, if the strap and the attaching points are not centered on the wheel, the strap can work its way off of the wheel as the cargo vehicle shifts against the strap and unanticipated loading can be imposed on the cargo vehicle's steering and suspension components.

While the soft tie-down vehicle restraint provides an alternative to the hard tie-down vehicle restraint that is appropriate, and even necessary, for some vehicles, it is not always the better method of restraint and, due to limitations in the construction of transporters and vehicle retention hardware; it is often difficult to execute either method correctly. What is desired, therefore, is a vehicle transporter having a low tare weight and a large payload that includes a cargo vehicle support system providing convenient and accurate vehicle restraint utilizing either a hard tie-down or a soft tie-down to restrain the vehicular cargo.

BRIEF DESCRIPTION OF THE DRAWINGS

FIG. 1A is an elevation view of a vehicle restrained to a vehicle support structure with a first exemplary hard tie-down chain arrangement.

FIG. 1B is an elevation view of a vehicle restrained to a vehicle support structure with a second exemplary hard tie-down chain arrangement.

FIG. 3 is an elevation view of a trailer portion of an exemplary vehicle transporter.

FIG. 4 is a sectional view illustrating support of an exemplary vehicle support in a frame of a vehicle transporter.

FIG. 8 is a cut away view of a winch head and a pawl.

FIG. 9A is a side view of a winch bar for rotating a winch.

FIG. 9B is a partial section view of a handle of the winch bar of FIG. 9A.

FIG. 9C is a section view of an end portion of the handle of FIG. 9B.

FIG. 9D is a partial section view of the handle of the winch bar of FIG. 9A when the force exerted on the handle exceeds a selected force.

DETAILED DESCRIPTION

Figure 2:
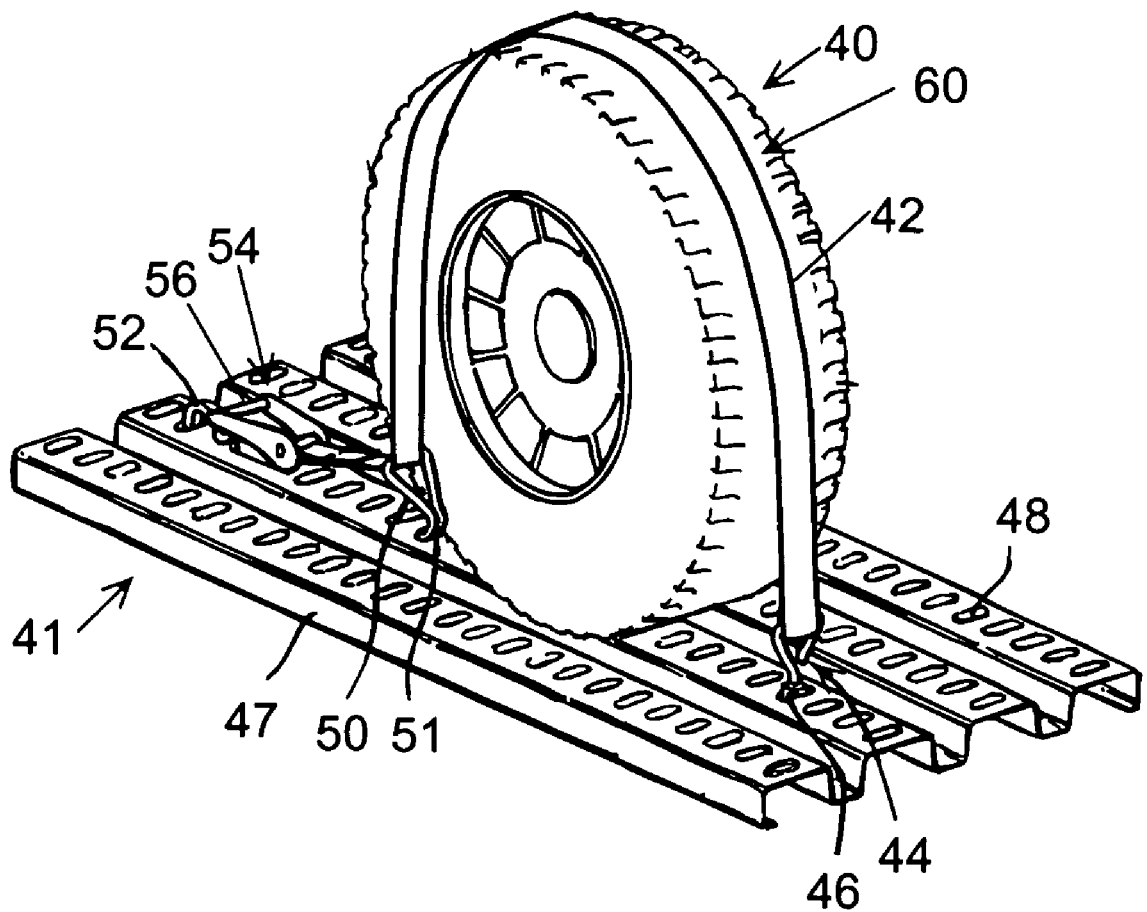
FIG. 2 is a perspective view of a wheel restrained to a prior art vehicle support structure.

Referring in detail to the drawings where similar parts are identified by like reference numerals, and, more particularly to FIG. 3, an exemplary vehicle transporter 80 comprises, generally, a truck (not illustrated) and a trailer 82 connected by a hitch 84. The truck and the trailer 82 are both adapted to carry a plurality of automobiles or other vehicles as cargo.

The trailer 82 includes a trailer frame 86 including a plurality of posts 88 that project upward along either side of the frame. One or more vehicles of a lower tier of cargo vehicles, for example automobile 90, can be supported on their respective running gear on one or more lower vehicle supports 92 that are supported by the trailer frame. A lower vehicle support 92 may be fixed to the trailer's frame or may be movable relative to the frame. For example, a lower tier vehicle support may be lowered to a position adjacent the bottom of transporter frame to minimize the height of the load for travel but may be tilted up at one end to form a ramp to the top of the wheels 95 to facilitate loading and unloading vehicular cargo. The wheels of vehicles of an upper tier of cargo, for example automobile 94, are supported by comparable vehicle supports 96 elevated above the lower support 92. While one or more of the vehicle supports for the upper tier of vehicles may be fixed relative to the trailer's frame 86, at least one end and often both ends of a vehicle support are commonly supported by one or more actuators that are, in turn, connected to the transporter's frame. This permits the vehicle support 96 to be displaced vertically by coordinated extension or retraction of actuators supporting both ends of the vehicle support or tilted by extension or retraction of actuators supporting only one of the ends of the vehicle support. Raising, lowering and tilting the vehicle supports permits formation of a continuous driving surface from the front to the back of the transporter for loading and unloading the cargo vehicles. For example, the rear portion of the upper tier vehicle support 98 is supported by a telescoping actuator 100 and can be lowered by retracting the actuator to form a ramp for vehicles of the upper tier of cargo. In addition, raising, lowering, and tilting the vehicle supports can be used to shift the positions and orientations of cargo vehicles to lower the height of the transporter to meet legal requirements and clear overhead obstacles.

Similarly, the truck of the exemplary transporter 80 includes a truck frame with a plurality of posts projecting upward along either side of the frame. Vehicle supports supported by the truck frame can support one or more vehicles of a lower tier and an upper tier of cargo vehicles. The vehicle supports may be either fixed to the truck's frame or movable relative to the frame.

The inventors realized that no single method of vehicle restraint, either hard tie-down or soft tie-down, is preferable for restraining all vehicles and that the flexibility and utility of a vehicle transporter could be enhanced by the ability to utilize either method of restraint according to the dictates of the cargo vehicle. In addition, the inventors realized that correctly tensioning the restraint and aligning the respective points of engagement of the restraint with the vehicle transporter and the cargo vehicle is significant to both hard tie-down and soft tie-down vehicle restraint. Variation in cargo vehicle position, tie-down eye location, tread width and wheelbase make flexibility in selecting the transverse and longitudinal transporter restraint engagement points important to successful cargo vehicle restraint. Moreover, the ability to install the vehicle restraint while standing at ground level would promote consistent installation of the vehicle restraint and reduce the incidence of climbing when securing the upper tier of cargo and a consequent potential for operator injury.

Figure 13:
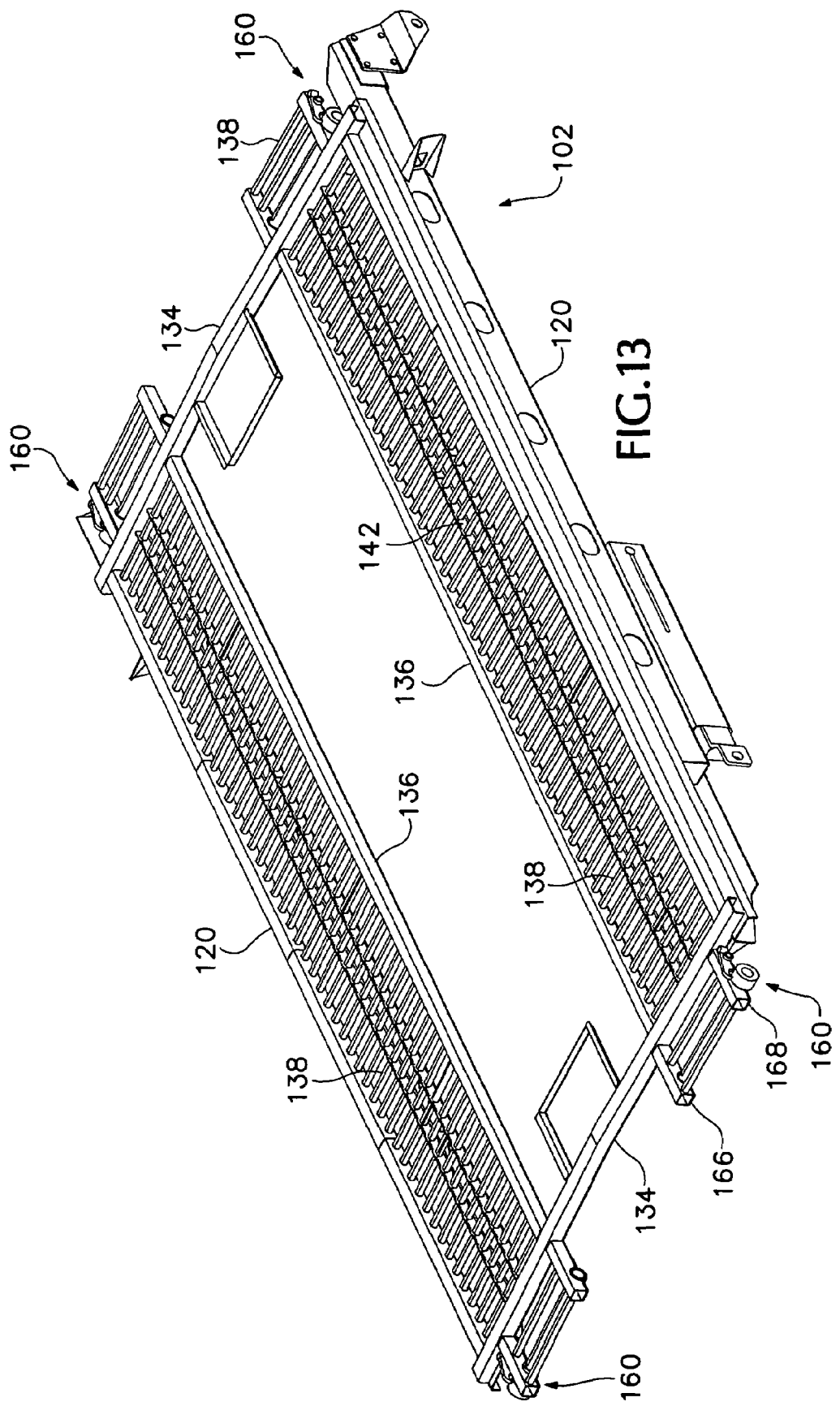
FIG. 13 is a perspective view of a vehicle support for a vehicle transporter.

Referring to FIGS. 4 and 13, an elongate vehicle support 102, generally representing the vehicle supports of the vehicle transporter 80, including the vehicle supports 92, 96 comprises a substantially rectangular framework including a pair of elongate outer beams 120 that are arranged adjacent and substantially parallel to the sides of the respective frame of the truck or trailer 82. A second elongate beam 136 extends parallel to, but is transversely spaced inboard of each of the outer beams 120. The second beams 136 are affixed to the transverse beams 134 and supported by the outer beams 120. The wheels of a cargo vehicle are supported by a plurality of transversely extending rungs 138 that have one end supported by an outer beam 120 and the other end supported by the corresponding second beam 136. The rungs 138 are spaced apart but are sufficiently close to enable the wheel of a vehicle to be supported by adjacent rungs and arranged so that their upper surfaces are aligned to approximate a plane over which the wheels of the cargo vehicle can be driven. The upper surfaces of the rungs include a plurality of surfaces 141 arranged to form ribs 140 to enhance the friction between the cargo vehicle's wheels and the rungs.

The strength and rigidity of the vehicle support 102 is enhanced by an elongate intermediate beam 142 that extends substantially parallel to and is approximately centered, transversely, between the transversely spaced second 136 and outer 120 beams. A plurality of rungs 138 of the vehicle support engage coaxial apertures extending transversely through the intermediate beam 142 and the concentrated loading produced by the wheels of cargo vehicles is spread over a number rungs and along a length of the outer and second beams by the intermediate beam, enabling a lighter vehicle support structure. An exemplary intermediate beam 142 has a channel cross-section comprising a base 144 and a pair of legs 146 that project normal to the base. The transversely spaced apart legs of the light weight channel also distribute wheel loading axially on the rungs enabling the use of lighter weight rungs. To enhance the traction of a vehicle being driven onto the vehicle support, the upper edges of the legs 146 of the intermediate beam 142 comprise pluralities of surfaces 143 arranged to increase friction between the edge of the leg and a wheel of a cargo vehicle.

The outer beams 120 of the vehicle support 102 and, therefore, the vehicle support are typically supported by a connection to the respective truck or trailer frame. A fixed vehicle support can be pinned or bolted to the truck or trailer frame. If the vehicle support 102 is movable in the frame of the transporter, one or both ends of the rectangular framework is typically supported a pair of actuators. Although hydraulic cylinders are commonly used to movably support the vehicle supports of vehicle transporters, the movable vehicle supports 102 of the exemplary vehicle transporter 80 are typically supported by powered screw actuators.

The powered screw actuators include powered screws 122 that are supported by and substantially enclosed within the vertical posts 88 projecting upward at the sides of the respective truck or trailer 86 frame. The screw 122 is arranged to rotate in a bearing 124 that is supported by the post 88 and is rotated by a hydraulic motor 129 attached to the frame of the truck or trailer 86. A movable nut 126, in threaded engagement with the screw 122 and retained within the post, moves up or down as the screw is rotated in one direction or the other. Typically, the outer elongate beams 120, at one end of the vehicle support 102, are attached to the nut 126 of the respective screw 122 by a pivot 128 that protrudes through a slot 130 in the inner surface of the post. The second end of the outer beam is connected to the nut 126 of its respective screw 122 by a link 132. As a result, the vehicle support 102 is restrained horizontally by the pivoting connection but the ends of the framework can move independently to permit tilting of the vehicle support as necessary to align with adjacent vehicle supports or to minimize the dimensions of the transporter. The movable nut 126 can travel the full length of the screw 122, enabling lowering of the upper vehicle support 96 to the level of the lower vehicle support 92 which commonly can be lowered to the bottom of the trailer frame. This permits the transporter's operator to stand on the ground while installing or removing the vehicle retention apparatus for vehicles on the upper tier of vehicle supports. As a result, there is less chance of the operator falling from the transporter or a ladder or dropping an object on another cargo vehicle. In addition, the operator can assume a more consistent position relative to the tensioners used to secure the cargo vehicle, facilitating more consistent application of the vehicle restraint.

Figure 5:
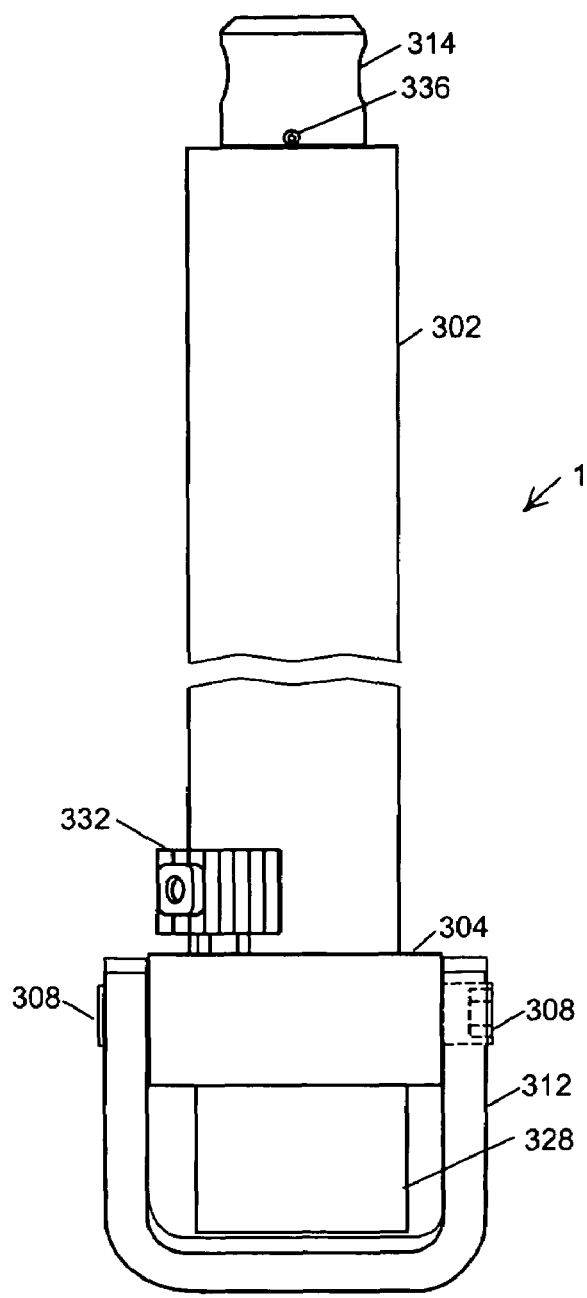
FIG. 5 is an elevation view of an exemplary telescoping screw actuator.
Figure 6:
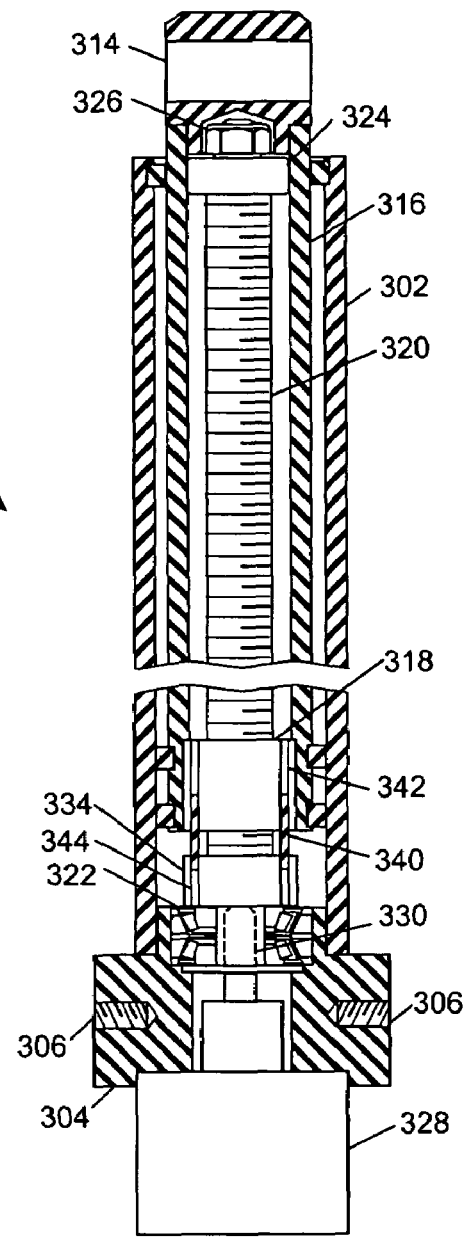
FIG. 6 is a cross-section of the exemplary telescoping screw actuator of FIG. 5.
Figure 14:
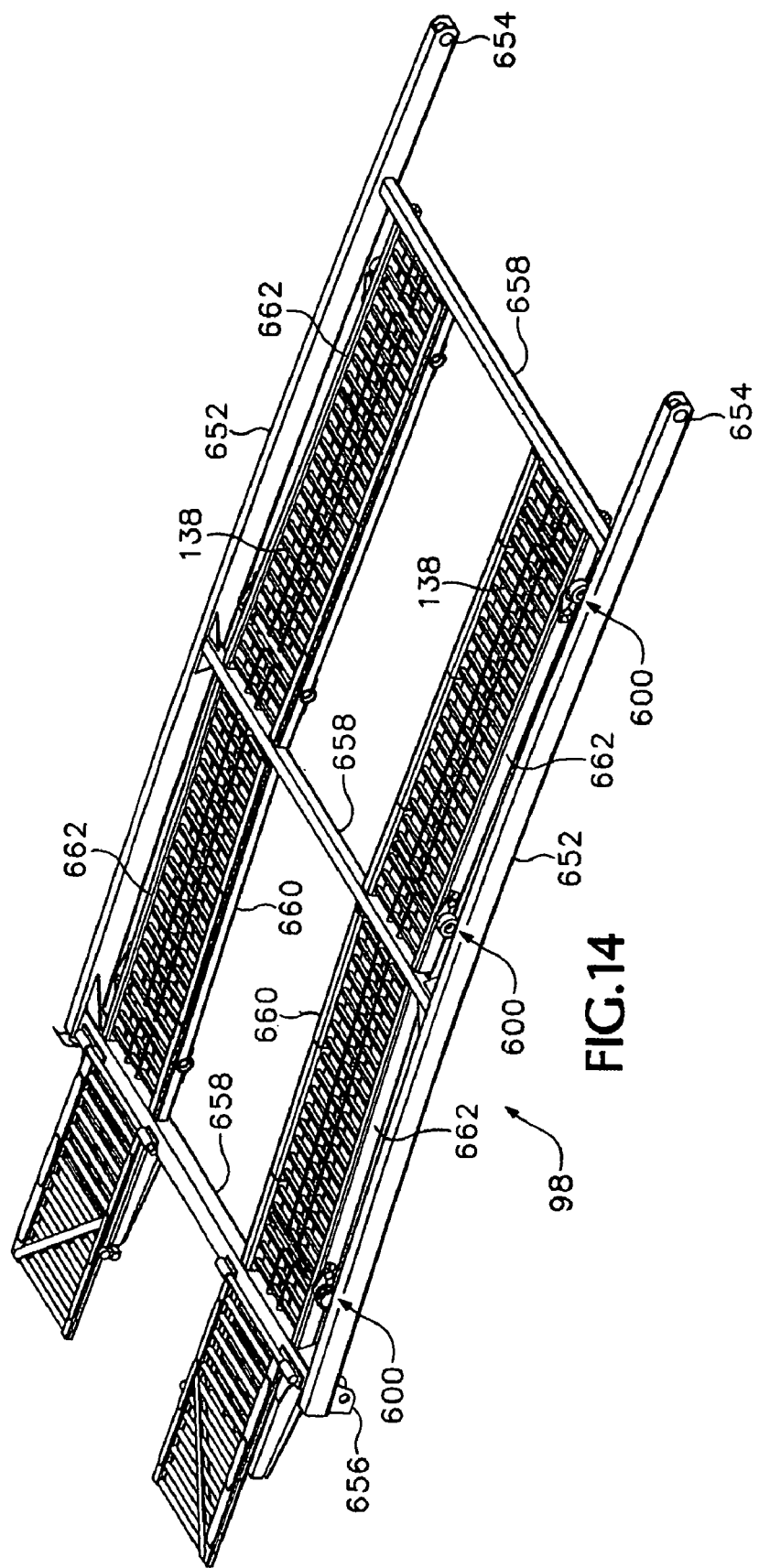
FIG. 14 is a perspective view of another vehicle support for a vehicle transporter.

Referring to FIGS. 5, 6 and 14, a telescoping screw actuator, as disclosed in pending U.S. patent application Ser. No. 10/812,748, incorporated herein by reference, may also be used to movably support vehicle supports of the vehicle transporter 80. For example, the forward end of the exemplary vehicle support 98 is pivotally connected to a carriage 99 that is vertically movable in the frame of the transporter 80 and the rearward end is supported by an extendible screw actuator 100 that is connected at its lower end to the frame of the transporter. The vehicle support 98 comprises generally a pair of parallel outer beams 652 that are respectively arranged adjacent to, and substantially parallel to, an edge of the transporter's frame. The each of the outer beams 652 includes an aperture 654 for pivotally connecting the forward end of the outer beam to the carriage 99 on either side of the transporter's frame. Each of the outer beams 652 also includes an aperture 656 for a pin to connect the second end of the outer beam to an extendible actuator. Transverse beams 658 connect the outer beams 652 proximate middle and either end of the vehicle support 98. Second beams 660 spaced transversely from the outer beams 652 toward the lateral center of the vehicle support 98 are affixed to the transverse beams 658. Third longitudinal beams 662 located between an outer beams 652 and second beams 660 are also affixed to the transverse beams 658. A plurality of spaced rungs 138 are supported by the second beams 660 and the third longitudinal beams 662 to form a support for the wheels of cargo vehicles. The rigidity of the vehicle support 98 is enhanced by an elongate intermediate beam 142 that extends substantially parallel to and is approximately centered, transversely, between the transversely spaced second 660 and third longitudinal 662 beams.

An exemplary extendible screw actuator, such as the screw actuator 100 supporting the vehicle support 98, includes a hollow tubular shell 302 that is affixed to a mount 304. The mount 304 includes tapped holes 306 to receive screws 308. The round heads of the screws 308 provide a pivoting connection for a cooperating yoke 312, attachable to a member in the transporter's frame. A second member, for example vehicle support 98, is connectible to the actuator 100 by a pin engaging a cross bore 314 in a slide tube 316 that is arranged to slide in the interior of the tubular shell 302. The slide tube 316 is extended and retracted in the tubular shell 302 by the interaction of screw 320 and a nut 318, in threaded engagement with the screw and in captive engagement with the slide tube. The screw 320 is rotatably supported at one end by bearings 322 arranged in the mount 304 and at the other end by a guide 324 that is slidable in the interior of the slide tube 316. A locking nut 326 retains the guide 324 to the screw 320. The screw 320 is rotated by a hydraulic motor 328 that has a frame that bolted to the base of the mount 304 and a rotatable shaft 330 having an exterior spline that engages a cooperating interior spline in an aperture in the end of the screw 320. A hydraulic valve 332, attached to the mount 304, is connected to a fluid port in the motor 328 by passageways internal to the mount. The valve 332 can selectively block the flow of fluid to or from at least one port of the motor 328 to control rotation of the motor.

A follower nut 334 is threaded onto the screw 320 in a spaced relationship to the nut 318. The follower nut 334 is constrained against rotation by pins 340 inserted in bores 342 and 344 in the nut 318 and the follower nut 334, respectively. If the threads of the nut 318 should fail, the slide tube 316 will retract into tubular shell 302 until it is supported by the follower nut 334. An indicator, such as a mark 336, on the slide tube 316 that is not visible when the slide tube is fully retracted and either the slide tube and the nut 318 is in contact with the follower nut 334 indicates the need to repair or replace a damaged actuator.

The tensioners for restraining the vehicular cargo of the vehicle transporter 80 are attached to the vehicle transporter to avoid loose pieces that must be handled by the operator and which might be misplaced during use. An exemplary tensioner is a manually operated winch similar in type to manually operated winches used to secure non-vehicular cargo on transport vehicles by tensioning a load engaging flexible member that is wound on the winch. An exemplary winch 160 comprises a rotatable winch shaft 162 around which a flexible member can be wound by rotating the winch shaft. The winch shaft is extends axially for a majority of the transverse separation of the outer beam 120 and the second beam 136. The winch shaft 162 is mounted for rotation but otherwise constrained to the vehicle support by bearings 164 that are fitted in winch beams 166, 168 that project from the transverse beam 134 in a direction parallel to the outer beam 120. Referring also to FIG. 8, a ratchet 172, attached to the winch shaft 162 proximate one end of the shaft, and a pawl 174, pivotally attached to the vehicle support 102, permits the winch shaft to be rotated freely in one direction and selectively, when the pawl is disengaged from the ratchet, in the opposite direction. A winch head 176 attached proximate one end of the winch shaft 162 includes a plurality of bar apertures 178 for receiving an end of a winch bar 500. The operator can exert torque to rotate the winch shaft and tension a flexible member wound on the shaft by exerting a force on the winch bar that is transverse to and remote from the winch shaft.

The winch shaft 162 includes a portion defining a slot 170 that extends axially in the shaft for a majority of the width of the transverse separation of the outer beam 120 and the second beam 136. An end portion of a strap or other elongate flexible load retention member 202 can be inserted into the slot 170 and captured by rotating the shaft. Alternatively, to avoid loose pieces that may be misplaced during loading and unloading of the transporter, the end portion of the elongate flexible load member may be restrained against withdrawal from the slot 170 in the winch shaft. For example, as illustrated in FIG. 4, a loop may be formed in the end of the flexible member 202 that is inserted into the slot 170. A pin 171 inserted through the loop prevents the member from being withdrawn from the slot but allows the member to be moved axially in the slot. The axial length of the slot 170 permits the operator to position the strap in continuous alternative positions transverse to the vehicle support 102 for a majority of transverse separation of the outer and second beams to facilitate transverse alignment of the flexible load retention member, as wound on the shaft, with the transverse position of the strap's other points of engagement with the vehicle and with the vehicle support (if any). In another embodiment of the axially elongate winch shaft, the axial extent of the slot is less, typically approximating the width of the strap or other elongate flexible load retention member to be received in the slot. When the load retention member is wound on the winch shaft 162 preparatory to tensioning, the load retention member can be spirally wound away from the slot, as necessary, to transversely align the point of take up of the flexible member on the shaft with the other points where the member will be restrained by the vehicle and the vehicle support.

Figure 15:
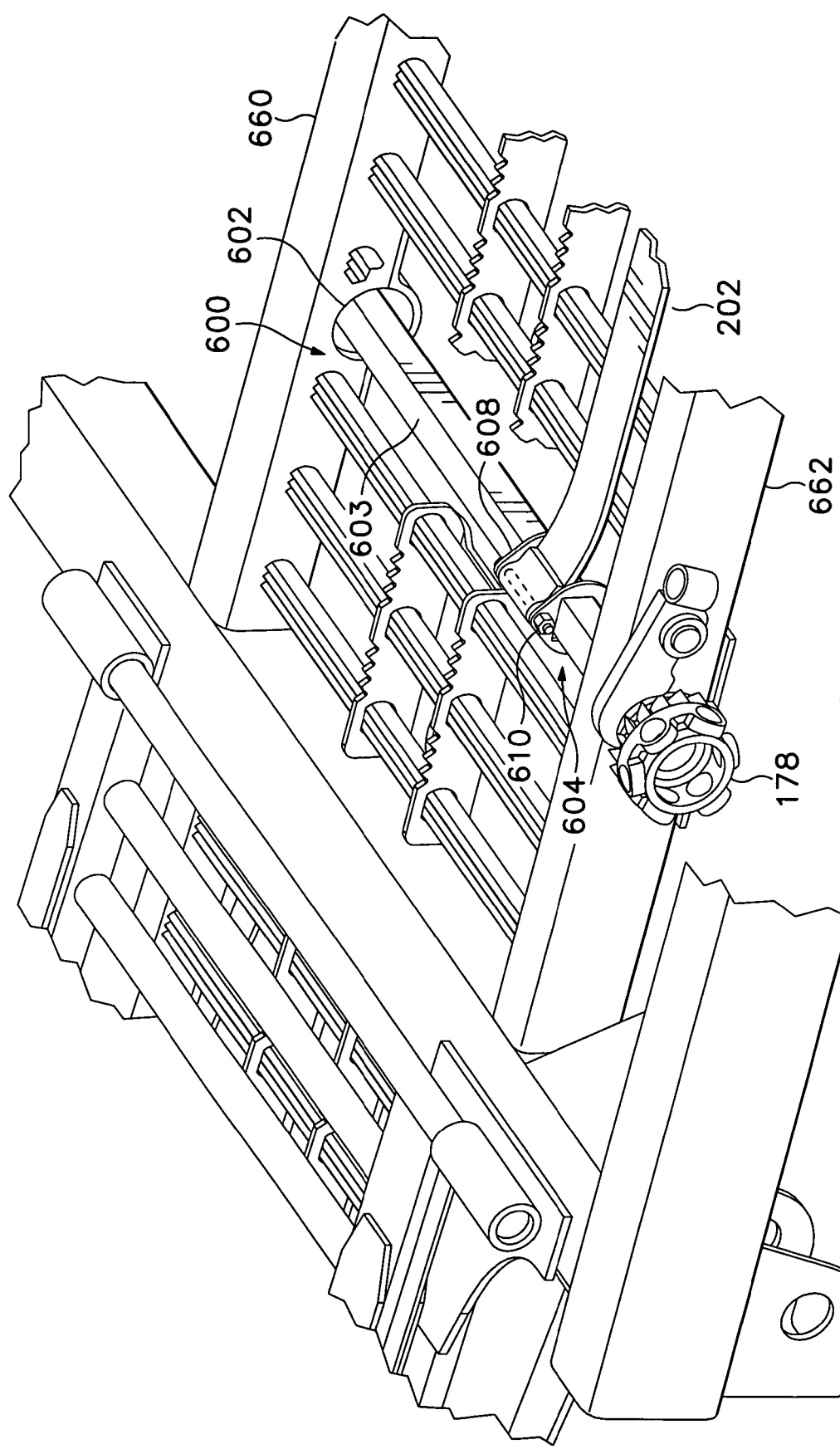
FIG. 15 is a perspective view of an additional embodiment of a cargo securing winch.

Referring to FIG. 15, an additional embodiment of a winch 600 for winding up and tensioning a flexible load retention member comprises a winch shaft 602 mounted for rotation but otherwise constrained by parallel beams, for example a second beam 660 and a longitudinal third beam 662 of the vehicle support 98, and a winch drum 604 mounted on the winch shaft 602 such that the winch drum is constrained to rotate with the winch shaft but movable axially thereon. The winch shaft 602 includes an axially extending portion having a polygonal cross-section 603 that extends for a majority of the transverse separation of the second 660 and third longitudinal 662 beams. The winch drum 604 comprises flanges 610 and a barrel 608 and includes a central aperture that corresponds to the cross section of the polygonal portion of the winch shaft 602. The cross-section of the exemplary polygonal portion 603 of the winch shaft 602 is square and the barrel 608 of the winch comprises a square tube having an inner surface slidable on the square portion of the winch shaft. On the other hand, corresponding splines, ellipses or axially extending keys and slots could be used to constrain the winch drum for rotation while enabling axial movement on the winch shaft. The correspondence of the aperture in the winch drum 604 constrains the winch drum to rotate with the winch shaft but permits the winch drum to be moved axially on the shaft to facilitate transverse alignment of the portion of the flexible load retention member wound on the winch with the other points of engagement of the member with the vehicle and the vehicle support (if any). The end of the flexible load retention member 202 may be restrained to the winch drum 604 by, for example, a bolt extending through a loop in the end of the flexible load retention member. However, other methods may be used to restrain the strap to the winch.

Figure 7:
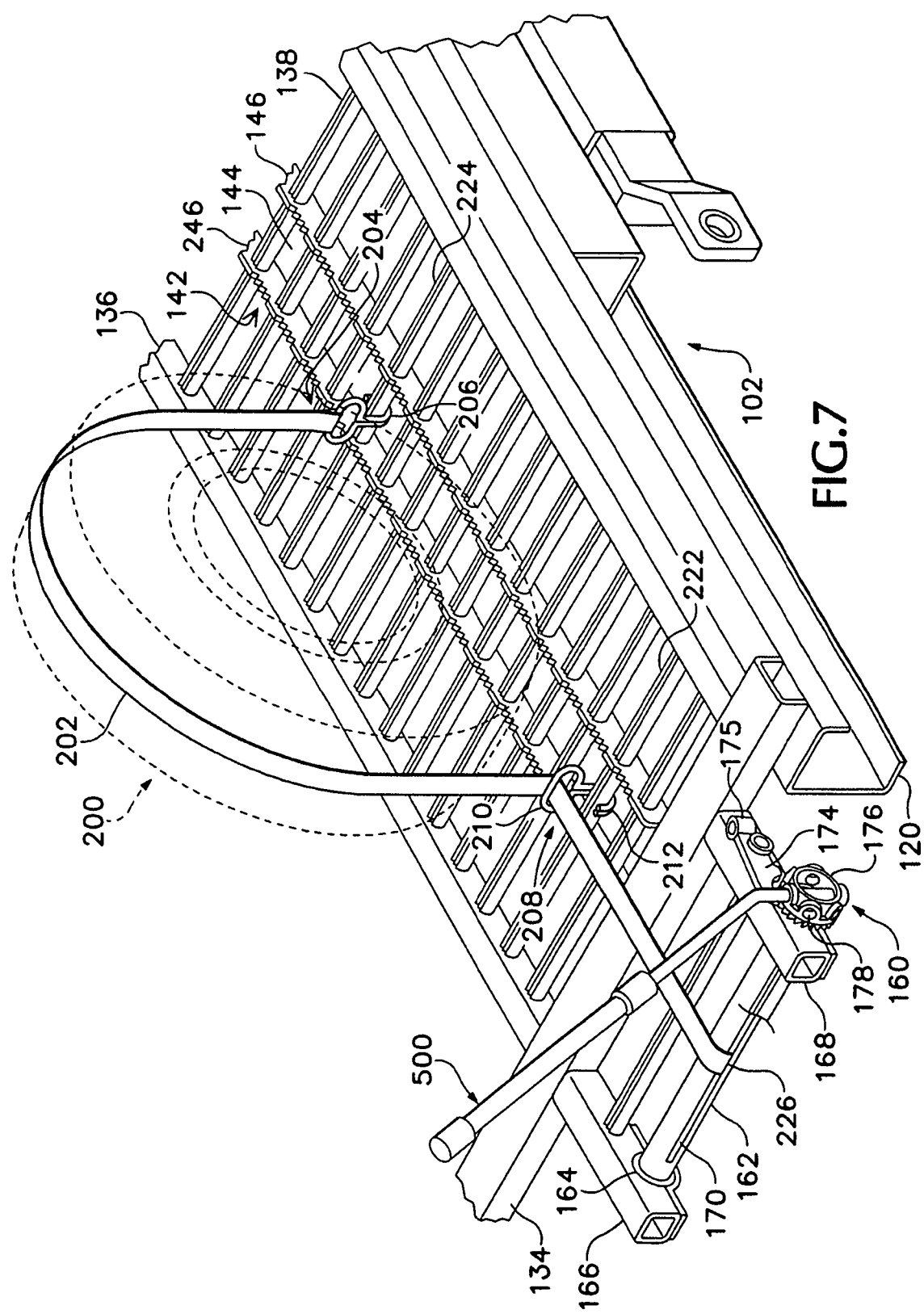
FIG. 7 is a perspective view illustrating a first soft tie-down method and apparatus for restraining a wheel of a vehicle.

Referring again to FIG. 7, to secure a vehicle using a first soft tie-down retention method, the operator positions the vehicle's wheels on the rungs 138 of a vehicle support 102, 98. An elongate flexible load retention member 202 is placed over the upper portion of the circumferential surface of a wheel 200 so that a portion of the surface of the flexible member is in contact with a portion of the circumferential surface of the wheel. Preferably, the lateral center of the surface of the flexible member 202 is substantially aligned with the lateral center of the circumferential surface of the wheel so that the tire sidewalls' resistance to deformation will aid in maintaining the engagement of the wheel and the flexible member. The flexible member 202 typically comprises a strap of nylon or other natural or synthetic material. A hook 206 or other engagement device, such as a bar to engage adjacent rungs, attached to a first end 204 portion of the flexible member is engaged with one of the rungs 224 of the vehicle support on the side of the vehicle's wheel more remote from the winch 160. An idler 208, movable on the flexible member 202, is engaged with another rung 222 of the vehicle support proximate the wheel and on the side of the wheel nearer to the winch 160. While the rungs of the vehicle support are spaced apart, they are sufficiently close together to support the wheels of the vehicular cargo and, therefore, provide multiple alternative points along the full length of the elongate vehicle support for connecting the end of the flexible member and the idler to accommodate vehicles having a wide range of wheelbases and located in varying positions on the vehicle support. The exemplary idler 208 comprises a hook 212, or other device engageable with a rung or a plurality of rungs of the vehicle support, connected to a generally rectangular loop 210 through which the flexible member 202 can move. The rectangular loop 210 bears on a surface of the flexible member 202 to restrain movement of an intermediate portion of the flexible member relative to the vehicle support when tension is applied to the member. A portion of the flexible member 202 proximate its second end 226 is inserted into the slot 170 in the winch shaft 162, if not retained therein, and the winch shaft is rotated to capture and wind the member onto the shaft. As the flexible member 202 is wound onto the winch shaft 162 the length of the member between winch shaft and the first end of the member is shortened and tension is exerted in the flexible member. The ratchet 172 and pawl 174 of the winch 160 prevent the release of tension in the flexible member until the operator inserts a bar in a bar aperture 175 on the pawl and moves the pawl to release the ratchet and the winch shaft. When a flexible member 202, in engagement with a wheel 200 of a cargo vehicle, is tightened movement of the wheel is resisted by the friction between the wheel, the member and the vehicle support and by the tensile force exerted on the wheel by the strap when the wheel is displaced relative to the connections to the vehicle support. The winch shaft 162 extends axially for the majority of the transverse distance between the outer 120 and second 136 beams of the vehicle support enabling the flexible member to be moved to alternate positions transverse to the vehicle support. Likewise, the points of engagement of the flexible member with the rungs of the vehicle support are movable axially on the rungs. As a result, the points of restraint of the flexible member can be aligned with each other and with the lateral centers of wheels located in a continuous range of transverse positions on the vehicle support so that forces exerted by the strap on the wheel do not urge disengagement of the flexible member from the circumferential surface of the wheel or impose unanticipated loads on the steering or suspension of the cargo vehicle.

To improve the consistency of cargo securement by reducing the likelihood of over- or under-tensioning of the flexible member 202, the winch includes a transducer that provides audible and tactile indication to the operator when the correct tension is being exerted by the flexible member. Referring to FIGS. 9A-9D, by inserting a winch bar into cooperating apertures 178 in the winch head 176 and applying a force transverse to the bar, the operator can rotate the winch shaft 162 to wind the flexible member on the shaft. The winch bar 500 comprises a bar 502 having a first end arranged to enable engagement with the apertures 178 in the winch head 176 and which projects substantially radially from the winch shaft when so engaged. The winch bar 502 also includes a hollow tubular handle 504 having with an outer surface for engagement by the operator's hand and an inner dimension 506 that is slightly larger than the bar 502. The handle 504 is arranged to encircle a portion of the bar 502 proximate its second end 512. A collar 506, affixed to the bar 502, engages a cap 508 that is affixed to the handle 504 and prevents longitudinal displacement of the handle in the direction of the second end 512 of the bar. The cap 508 has portions defining a central aperture that supports the bar in the center of the interior of the tubular handle 504 but permits the second end 512 of the bar to move transversely in the interior of the handle. The bar 502 is supported in the interior of the handle 504 at the second end 512 of the bar by a detent 513 comprising a ball 514 that engages a recess 516 in the end of the bar. The ball 514 also engages a recess 518 in an end of a plug 520 that is slidable in the interior of the handle 504. A resilient member, such as a spring 522, retained by a cap 524 urges the plug 520 toward the end 512 of the bar 502 trapping the ball 514 in the respective recesses.

The tension in the flexible member 202 exerts a moment on the winch shaft 160 in opposition to the moment produced by the transverse force exerted on the handle 504 by the operator. These forces are transmitted from the handle 504 to the bar 502 at the points of contact of the ball 514 with surfaces of the respective recesses 518, 516 in the plug 520 and the end of the bar. When the force on the handle 504 reaches a selected force equivalent to a desired tension in the flexible member 202, the ball 520 is urged out of the recess 516 in the bar 502 or the recess 518 in the plug 520 against the resisting force of the resilient member, spring 522, and an audible and a tactile indication is emitted as the end of the bar 502 moves in the handle 504. The tension at which the indication is emitted may be adjusted by tightening or loosening a threaded cap 524 on the handle 504 which respectively increases or decreases the force exerted on the plug by the resilient member. The transducer signals the operator when the correct tension is being exerted on the flexible member reducing the chance of over exertion by the operator or damage to the vehicle from over- or under-tensioning the flexible member when restraining a vehicle with a soft tie-down or a hard tie-down.

Figure 10:
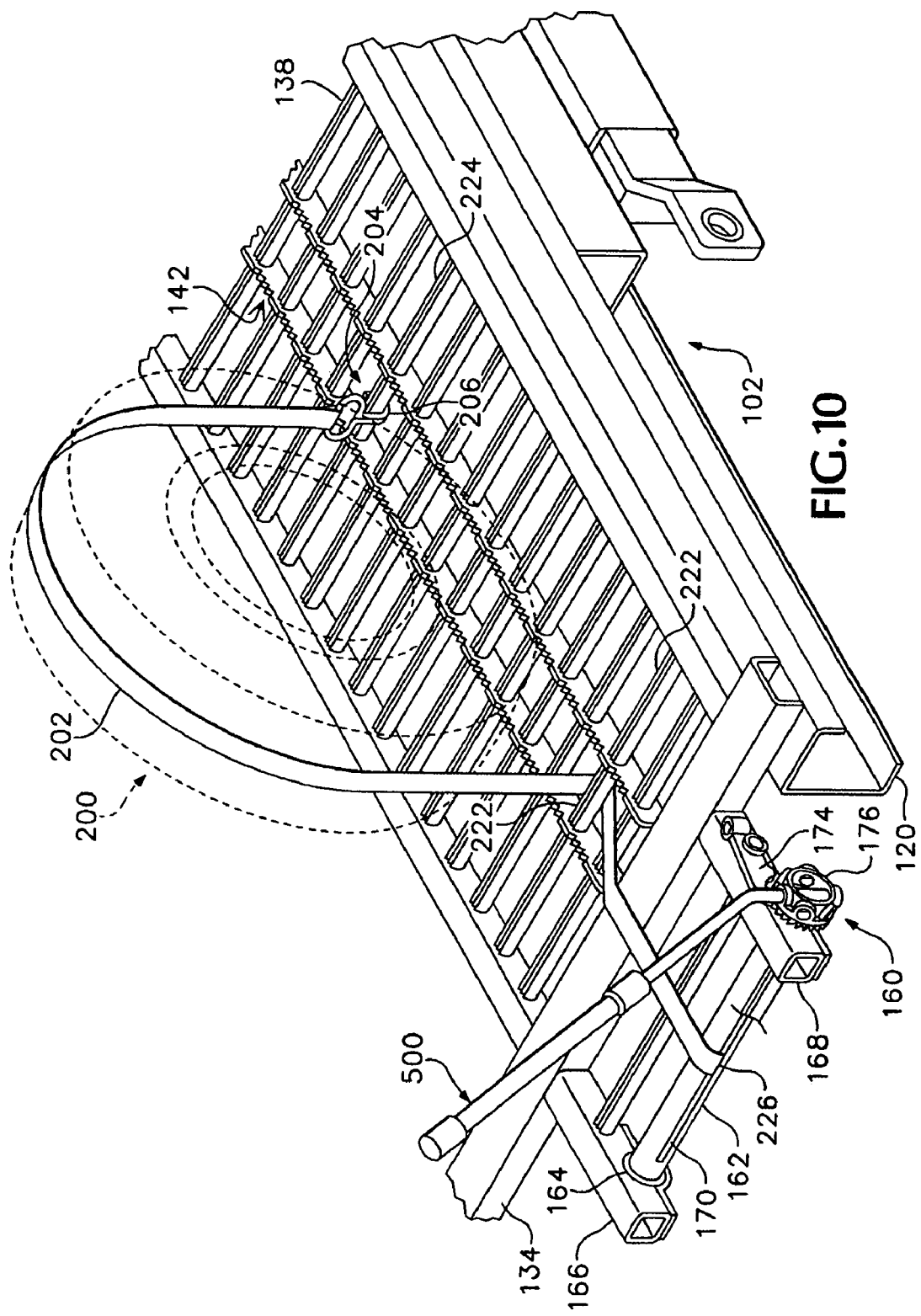
FIG. 10 is a perspective view illustrating a second soft tie-down method and apparatus for restraining a wheel of a vehicle.

Referring to FIG. 10, a second soft tie-down method is simpler than the first soft tie-down method because an idler is not used and provides a method of soft tie-down vehicle restraint even if an idler is unavailable. In the second soft-tie down method an intermediate portion of the elongate flexible member 202, between the portion engaging the winch and the portion engaging the circumferential surface of the wheel, passes below a rung 222 of the vehicle support. The flexible member 202 is placed over the circumferential surface of the wheel 200 with the lateral center of the surface of the member in contact with the wheel preferably substantially aligned with the lateral center of the wheel's circumferential surface. The hook 206 at the first end 204 of the member 202 is engaged with one of the rungs 224 of the vehicle support 102. A portion of the member 202 proximate the second end 212 is wound on the winch shaft to apply tension to the flexible member. The rung 222 of the vehicle support bears on the back surface of the flexible member 202 and prevents displacement of the member relative to the vehicle support when tension is exerted in the member by winding the member on the winch shaft 162. The axial extent of the winch shaft 162 and the rungs permits the flexible member 202 to be moved transversely with respect to the vehicle support enabling transverse alignment of the various points of restraint of the flexible member with each other and with the lateral centers of wheels that vary in transverse location on the vehicle support.

The utility of the vehicle transporter is further enhanced by the vehicle support and restraint system because the same equipment can be utilized for a hard tie-down vehicle restraint when a hard tie-down is appropriate or desirable for the cargo vehicle. If the vehicle is equipped with tie-down eyes or structures that are located proximate the ends of the vehicle, the flexible member can be extended directly from the winch to the tie-down location. Axial movement of the flexible member's engagement with the winch permits the ends of the member to be aligned transversely even though the transverse position of the tie-down eyes may vary.

Figure 11:
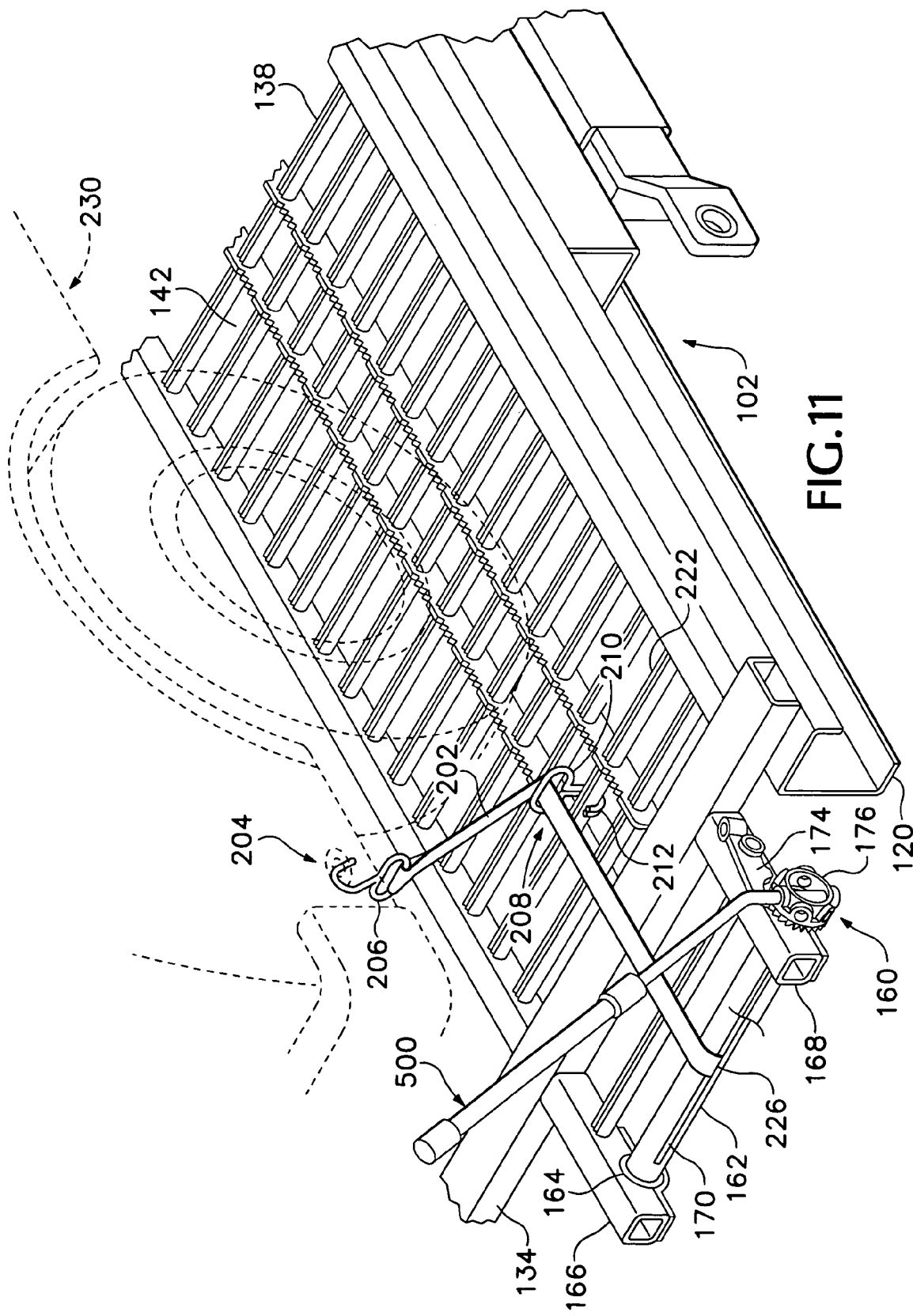
FIG. 11 is a perspective view illustrating a hard tie-down restraint of a vehicle.

Referring to FIG. 11, in another hard tie-down restraint method an idler is used in routing the flexible member from the winch to the point of engagement with the vehicle. The first end portion 204 of a flexible member 202 is affixed to the frame or body of a vehicle 230 by engaging the hook 206 at the end of the member with a tie-down eye or the vehicle's frame. If necessary to exert force on the vehicle in a direction away from the winch 160, an idler 208 is engaged with a rung 222 of the vehicle support. The loop portion 210 of the idler bears on the surface of the flexible member and resists displacement of the flexible member relative to the vehicle support when tension is exerted in the member. The portion of the flexible member 202 proximate the second end 226 is wound on the winch shaft to shorten the length of the member between the winch shaft and the first end portion's engagement with the vehicle and exert tension in the member to secure the vehicle. The transverse position of the flexible member on the winch shaft can be varied to align the member with the respective points of engagement of the flexible member with vehicle support and the vehicle, making tension in the member more consistent for the wide variation in tie-down locations on vehicle frames or bodies.

Figure 12:
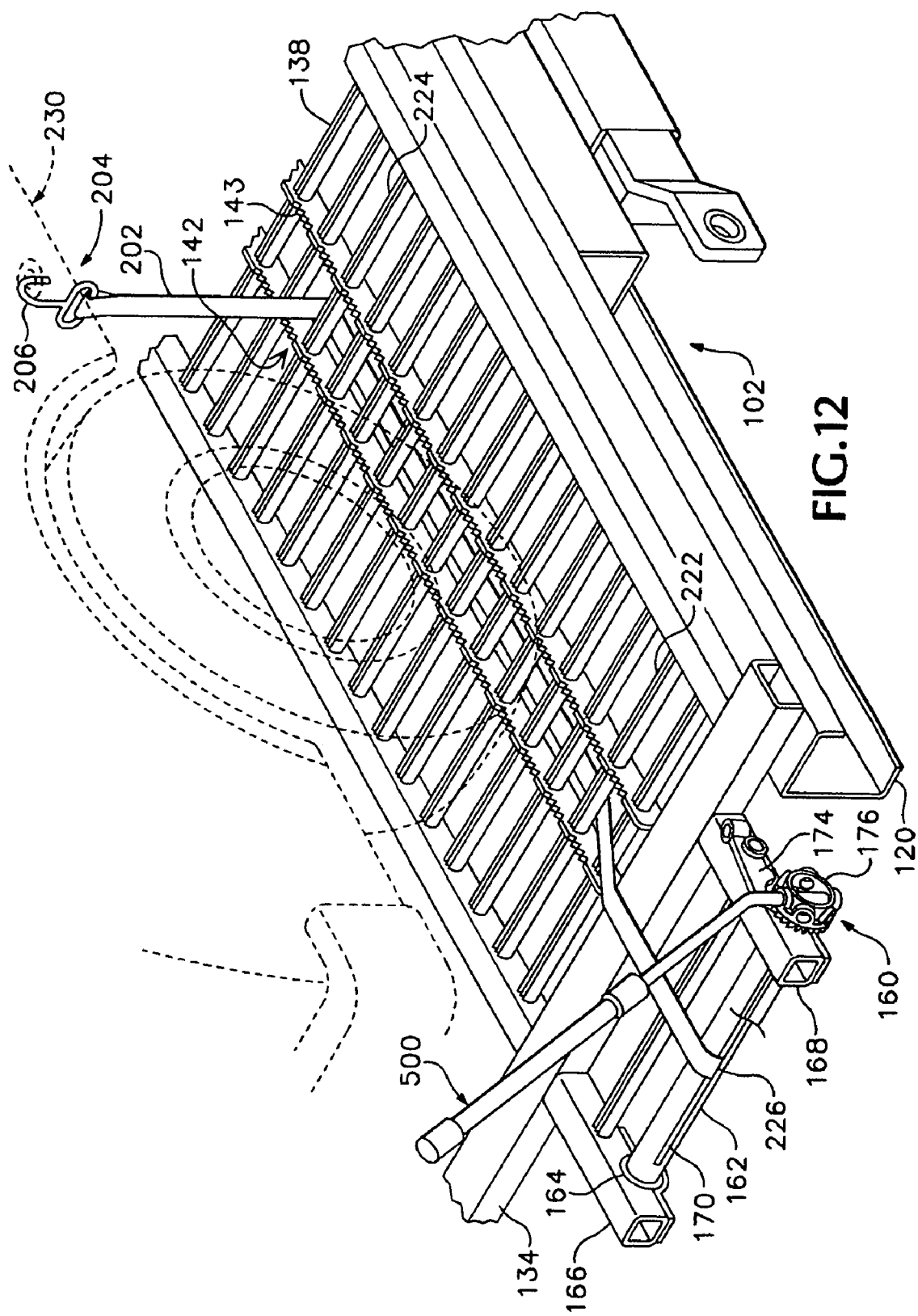
FIG. 12 is a perspective view illustrating another hard tie-down vehicle restraint.

Referring to FIG. 12, in an alternative hard tie-down method, the flexible member 202 is passed under a rung 222 of the vehicle support 102, if necessary to exert force on the vehicle in a direction away from the winch shaft 162, before the first end of the flexible member 202 is attached to the cargo vehicle 230 or, in the alternative, before the second end is restrained to the winch. When tension is exerted in the member 202 by rotation of the winch shaft 162, the rung 222 resists the displacement of the member by bearing on the back surface of an intermediate portion of the member between the first and second ends. The axial length of the winch shaft 162 and ability to adjust the lateral position of the flexible member 202 facilitates aligning the take-up point on the winch with the attachment to the cargo vehicle and to the vehicle support. The hard tie-down methods avoid routing the flexible member over edges that might abrade and wear a non-metallic strap. The ability to transversely align the points of engagement of the flexible member with the vehicle and the vehicle support avoids routing arrangements that increase friction and, thereby, increase the likelihood of incorrect tension in the member. Moreover, operators are apprised when the tension in the flexible member is correct by the audible or tactile output of the winch transducer.

The light weight of the vehicle support structure and the vehicle retention apparatus enables construction of a vehicle transporter with a low tare weight, less than 40,000 lb. (dry weight), and high capacity. Moreover, the vehicle support structure permits the cargo to be secured with the operator standing at ground level reducing the possibility of falls. The vehicle restraint system permits the same equipment to be used to restrain vehicles with either a hard tie-down or a soft tie-down, substantially increasing the utility of the vehicle transporter. In addition, the security of the vehicular cargo is improved by the ability of align the points of engagement of the tie-down strap with the vehicle and vehicle support and to consistently tension the strap.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A winch comprising an elongate winch shaft rotatably affixed to a base and rotatable to wind a flexible member on said winch shaft at one of a continuity of alternative winding locations spaced axially along a major portion of said length of said winch shaft.

2. The winch of claim 1 further comprising a transducer capable of emitting at least one of an audible and a tactile indication of a magnitude of a tension force exerted in said flexible member.

3. The winch of claim 2 wherein said transducer comprises:
    (a) a bar having a thickness and a length extending between a first end arranged for selective engagement with said winch shaft and a second end;
    (b) a tubular handle having an outer dimension, an inner dimension greater than said thickness of said bar, and arranged to encircle a portion of said length of said bar proximate said second end of said bar, said tubular handle being supported by said bar proximate a first end of said tubular handle and having a second end movable relative to said second end of said bar; and
    (c) a detent arranged to support said second end of said bar within said inner dimension of said tubular handle and to release support of said bar when a force exerted by said handle on said bar exceeds a selected force, release of said support of said bar producing at least one of said audible indication and a said tactile indication of tension in said flexible member.

4. The winch of claim 1 wherein said winch shaft comprises portions defining an axially elongate slot, an end portion of said flexible member movable in said elongate slot to align said end portion with one of said continuity of alternative winding locations.

5. The winch of claim 4 further comprising a restraint to resist disengagement of said end portion of said flexible member and said winch shaft.

6. The winch of claim 4 further comprising a transducer capable of emitting at least one of an audible and a tactile indication of a magnitude of a tension force exerted in said flexible member.

7. The winch of claim 6 wherein said transducer comprises:
    (a) a bar having a thickness and a length extending between a first end arranged for selective engagement with said winch shaft and a second end;
    (b) a tubular handle having an outer dimension, an inner dimension greater than said thickness of said bar, and arranged to encircle a portion of said length of said bar proximate said second end of said bar, said tubular handle being supported by said bar proximate a first end of said tubular handle and having a second end movable relative to said second end of said bar; and
    (c) a detent arranged to support said second end of said bar within said inner dimension of said tubular handle and to release support of said bar when a force exerted by said handle on said bar exceeds a selected force, release of said support of said bar producing at least one of an audible and a tactile indication of tension in said flexible member.

8. The winch of claim 1 further comprising a winch drum axially movable on said winch shaft but constrained to rotate with said winch shaft, an end portion of said flexible member engageable with said winch drum.

9. The winch of claim 8 further comprising a restraint to resist disengagement of said end portion of said flexible member and said winch drum.

10. The winch of claim 8 further comprising a transducer capable of emitting at least one of an audible and a tactile indication of a magnitude of a tension force exerted in said flexible member.

11. The winch of claim 9 wherein said transducer comprises:
(a) a bar having a thickness and a length extending between a first end arranged for selective engagement with said winch shaft and a second end;
(b) a tubular handle having an outer dimension, an inner dimension greater than said thickness of said bar, and arranged to encircle a portion of said length of said bar proximate said second end of said bar, said tubular handle being supported by said bar proximate a first end of said tubular handle and having a second end movable relative to said second end of said bar; and
(c) a detent arranged to support said second end of said bar within said inner dimension of said tubular handle and to release support of said bar when a force exerted by said handle on said bar exceeds a selected force, release of said support of said bar producing at least one of said audible indication and a said tactile indication of tension in said flexible member.

12. A winch for restraining cargo, said winch comprising:
(a) an elongate winch shaft rotatably affixed to a base and freely rotatable in a first direction by an exertion of force on a bar engageable with said winch shaft and selectively rotatable in a second direction;
(b) a winch drum including a restraint to maintain engagement with an end portion of a flexible member, said winch drum constrained to rotate with said winch shaft to wind said flexible member on said winch drum and movable axially on said winch shaft to locate said end portion of said flexible member in one of a continuity of alternative winding locations along a majority of said length of said winch shaft; and
(c) a transducer capable of emitting at least one of an audible indication and a tactile indication of a magnitude of a tension force exerted in said flexible member by winding said member on said winch drum.

13. The winch of claim 12 wherein said winch drum comprises:
(a) a barrel having a first end and a second end and including a portion defining a barrel aperture connecting said first end and said second end, said barrel aperture having a shape enabling said winch shaft to be received in said barrel aperture and moved axially with respect to said barrel, said shape of said barrel aperture including a portion interfering with relative rotation of said winch shaft and said barrel;
(b) a first flange affixed at said first end of said barrel; and
(c) a second flange affixed at said second end of said barrel and cooperating with said first flange to confine said flexible member during winding on said winch drum.

14. The winch of claim 13 wherein said restraint comprises a pin engageable with said end portion of said flexible member and engageable with portions of said first and said second flanges to interconnect said first and said second flanges.

15. The winch of claim 12 wherein said transducer comprises:
(a) a bar having a thickness and a length extending between a first end arranged for selective engagement with said winch shaft and a second end;
(b) a tubular handle having an outer dimension, an inner dimension greater than said thickness of said bar, and arranged to encircle a portion of said length of said bar proximate said second end of said bar, said tubular handle being supported by said bar proximate a first end of said tubular handle and having a second end movable relative to said second end of said bar; and
(c) a detent arranged to support said second end of said bar within said inner dimension of said tubular handle and to release support of said bar when a force exerted by said handle on said bar exceeds a selected force, release of said support of said bar producing at least one of said audible indication and said tactile indication of tension in said flexible member.

16. A winch bar for rotating a winch shaft to exert a tension in a flexible member, said winch bar comprising:
(a) a bar portion having a thickness and a length extending between a first end arranged for selective engagement with said winch shaft and a second end;
(b) a tubular handle having an outer dimension, an inner dimension greater than said thickness of said bar portion, and arranged to encircle a portion of said length of said bar portion proximate said second end of said bar portion, said tubular handle being supported by said bar portion proximate a first end of said tubular handle and having a second end movable relative to said second end of said bar portion; and
(c) a detent arranged to support said second end of said bar portion within said inner dimension of said tubular handle and to release support of said bar portion when a force exerted by said handle on said bar portion exceeds a selected force, release of said support of said bar portion producing at least one of an audible indication and a tactile indication of tension in said flexible member.

* * * * *